Feb. 28, 1928.
F. G. FOLBERTH ET AL
1,661,134
MOTOR FOR WINDSHIELD CLEANERS
Original Filed Oct. 3, 1923    2 Sheets-Sheet 1
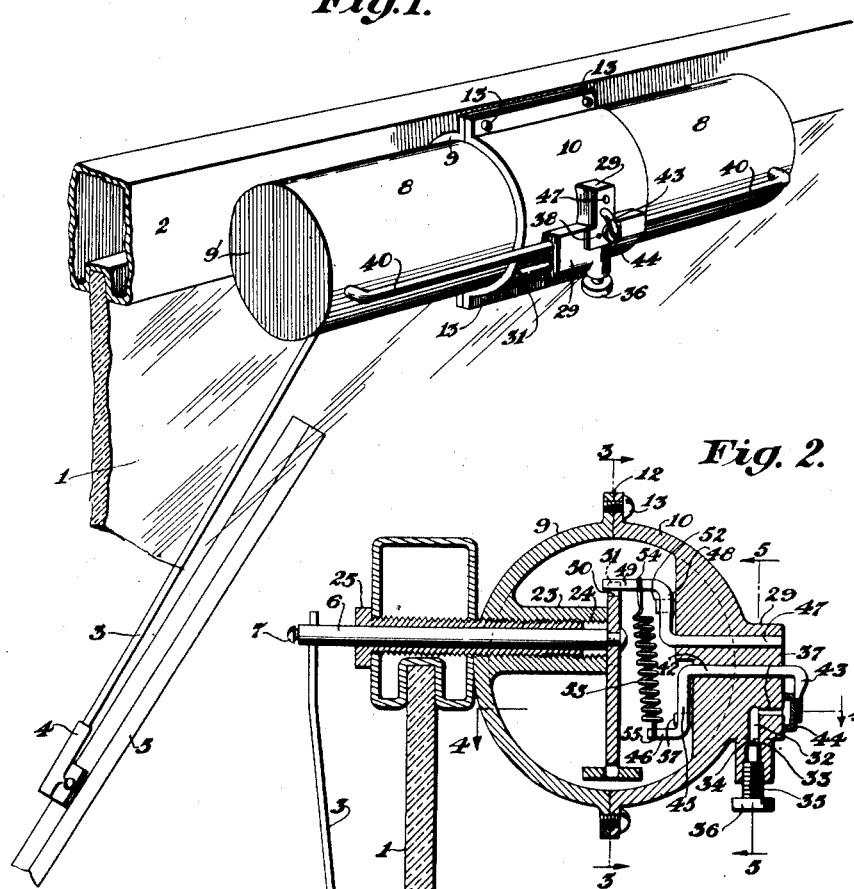
Inventor
Frederick G. Folberth
William M. Folberth
by Atty.

Feb. 28, 1928.
F. G. FOLBERTH ET AL
1,661,134
MOTOR FOR WINDSHIELD CLEANERS
Original Filed Oct. 3, 1923    2 Sheets-Sheet 2
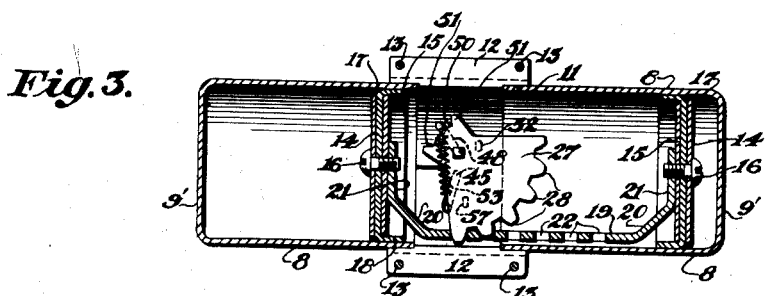
Fig. 3.
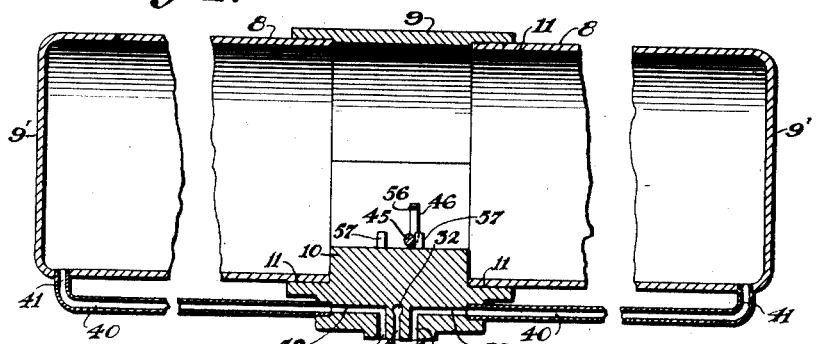
Fig. 4.
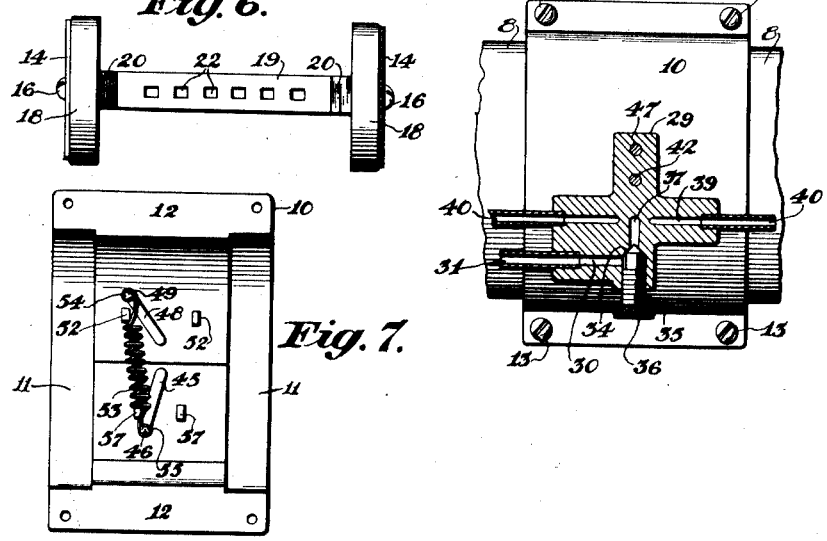
Fig. 6.   Fig. 5.
Fig. 7.
Inventor
Frederick G. Folberth
William M. Folberth
by
Atty. Barton A. Bean Jr.

Patented Feb. 28, 1928.

1,661,134

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK.

MOTOR FOR WINDSHIELD CLEANERS.

Original application filed October 3, 1923, Serial No. 666,367. Divided and this application filed August 4, 1926. Serial No. 127,005.

This invention relates to motors for automatic windshield cleaners of the fluid pressure type, and more particularly to the reciprocatory type wherein the casing is of cylindrical formation and houses a piston couple, each piston element of the couple operating in a respective end of the cylindrical casing under the influence of properly directed fluid pressure.

Heretofore, in the manufacture of windshield cleaners of the fluid pressure or suction operated type, wherein a piston reciprocates within a cylinder, the cylinder has been cast from molten metal and its proportions have been such as to render the weight and size of the windshield motor excessively heavy and cumbersome. The casting of these cylinders has also been quite tedious and expensive, which placed the retail price of the cleaner motor out of reach of the average operator of the light type of motor vehicles. The present invention aims to facilitate and cheapen the production of the motor cylinder by stamping the same from sheet metal stock, thereby providing a light and simple fluid pressure operated motor which may be readily mounted upon the vehicle windshield frame without the use of special supporting brackets or the drilling of many holes through the windshield frame.

The invention has for its object to improve the construction and mounting of the motor casing or cylinder, and in one form may be considered as consisting of a pair of opposed sheet metal cup members arranged with their open ends in opposition to each other, and their closed ends forming the ends of the cylinder casing, and a clamp member for connecting and holding said cup members in axially aligned relation.

The invention further resides in the construction of this clamp member and its cooperation with a mounting sleeve whereby the casing may be mounted on the frame of a windshield in a very simple and practical manner.

This application is a division of our copending application for patent on an automatic windshield cleaner, filed Oct. 3, 1923, Serial No. 666,367.

In the accompanying drawings, we have shown one embodiment of the invention. In this showing:

Figure 1 is a perspective view of a portion of a windshield and windshield frame showing the invention applied, Figure 2 is a central vertical sectional view, Figure 3 is a vertical sectional view on line 3—3 of Fig. 2, Figure 4 is a horizontal sectional view on line 4—4 of Fig. 2, Figure 5 is a detail sectional view on line 5—5 of Fig. 2, Figure 6 is a plan view of the pistons and connecting member, Figure 7 is a rear elevation of a semicylindrical casting showing a portion of the valve operating mechanism, and, Figure 8 is a perspective view of a similar casting showing the arrangement of the cleaner shaft.

Referring to the drawings, the reference numeral 1 designates generally a windshield or other transparent window to be cleaned. The windshield is mounted in a frame 2 in the usual manner, which frame is formed of metal. A cleaner arm 3 is arranged exteriorly of the windshield and is provided with retaining means 4 adapted to receive a wiper or cleaner element 5 adapted to contact with the windshield to be cleaned. The upper end of the cleaner arm passes through an opening in a cleaner shaft 6 and is retained in position by means of a suitable fastening element 7. The shaft passes through the windshield frame and extends into a motor casing arranged on the opposite side of the frame within the vehicle. As shown, the motor casing consists of two cylindrical members 8 having their outer ends closed, as at 9'. These cylindrical members may be formed of any suitable material but are preferably formed of metal and stamped or drawn out. The inner open ends of the cylindrical members are connected by a clamp consisting of a pair of semi-cylindrical castings 9 and 10. As shown, these castings are provided with recesses 11 at each end, adapted to receive the respective ends of the cylindrical members 8 and are further provided with upper and lower flanges 12, adapted to receive screws or bolts 13 to secure them to each other and hold the cylindrical members in position.

A pair of spaced pistons are mounted within the casing and each piston is adapted to reciprocate within one of the cylindrical members. As shown, each piston comprises a pair of disks 14 and 15, preferably formed of metal and slightly smaller in diameter than the inner diameter of the cylinders 8. These disks are connected by means of a bolt or screw 16 which passes through a sheet 17 of rubber or other suitable packing. As shown, the rubber sheet is larger than the diameter of the cylinder and is adapted to form a flange 18 to prevent leakage of air or other fluid around the piston. The pistons are connected by means of a web 19 which is preferably formed of metal and stamped to provide inclined portions 20 adjacent each end and upright end portions 21. The screws 16 are received in openings in the end portions 21 of the web to secure the pistons to the web. The web is provided with a plurality of spaced openings 22, which may be formed in the stamping operation and which form a part of the means for transmitting the movement of the pistons to the shaft 6.

The casting 9 of the clamp is provided with an inwardly extending boss 23 which is internally screw-threaded, as at 24. This boss is adapted to receive a bolt 25 passing through the opening in the windshield frame and surrounding the shaft. The motor casing is assembled on the frame of the windshield by tightening the bolt 25 and the bolt serves as the sole support and bearing for the cleaner shaft 6. The journal bearing 25 has a head or shoulder for engaging the outer side of the windshield frame bar. The casting may be further provided with projecting lugs or pins 26 on its outer face adapted to be received in openings in the windshield frame to assist in maintaining the motor casing in position. A plate 27 is secured to the inner end of the cleaner shaft and this plate is provided with an arcuate edge having teeth 28 formed thereon, providing a segmental gear adapted to mesh with the openings in the web 19. It will thus be seen that the reciprocation of the pistons in the cylinder or casing oscillates the plate 27 and thus oscillates the cleaner shaft to move the cleaner element over the exterior of the windshield.

Suitable automatic valve mechanism is provided to connect the opposite ends of the cylinder to a source of suction. As shown, the casting 10 is provided with an enlargement 29 on its exterior and this enlargement is bored through one end to provide a passage 30. A tube 31 is arranged in this passage and this tube is adapted to receive a rubber hose or other conduit (not shown) by means of which the passage is connected to the intake manifold of an internal combustion engine, or other suction producing means (not shown). A passage 32 is connected to the inner end of the passage 31 and extends upwardly. The end of this passage is provided with a valve seat 33 adapted to be engaged by a valve 34, formed on the end of a threaded stem 35. The threads of the valve stem engage internal threads in an enlargement on the lower end of the passage 32. The outer end of the valve stem is provided with an operating handle 36. The upper end of the passage 32 communicates with a passage 37 extending to the outer face of the enlargement 29. A passage 38 is arranged on each side of the passage 37 and these passages extend inwardly and communicate with longitudinally extending passages 39. The ends of the passages 39 are adapted to receive tubes 40 which extend longitudinally of the motor casing and are provided with offset ends 41, extending through the cylinder casing and communicating with the interior. In assembling the motor casing the cup-shaped cylinders or cylindrical members 8 are slid axially into their concaved seats or recesses 11 and by the same movement the inner ends of the tubes 40 are slid into the adjacent ends of passages 39 where they are held securely by the clamping section 9 and its screws 13.

An arm 42 extends through the casting 10 and the enlargement 29 above these passages and the outer end of the arm is extended downwardly as at 43, and carries a cup-shaped valve 44 on its lower end. The valve is adapted to oscillate over the exterior of the enlargement 29 and establish communication between the passage 37 and one of the passages 38, as shown in Figure 4 of the drawings. The inner end of the arm 42 is extended downwardly within the cylinder, as at 45, and is provided with an offset portion 46. A second arm 47 is arranged in an opening extending through the casting 10 and the enlargement 29 and this arm is provided with an extension 48 within the cylinder extending upwardly. The end of the arm 47 is offset, as at 49, and arranged over the offset end 46 of the arm 42. This offset end 49 extends over the plate 27 and the plate is provided with an arcuate portion 50, to permit the plate to oscillate without engaging the arm. An upwardly extending lug 51 is arranged at each end of the arcuate portion and is adapted to engage the offset 49 to swing the arm on its pivot. The inner face of the casting 10 is provided with a pair of lugs 52, adapted to engage the extended portion 48 of the arm to limit its movement. A coil spring 53 is arranged between the offset ends 46 and 49 of the arms, the upper end 54 of the spring being arranged over the offset 49 and the lower end 55 being arranged over the offset 46 of the lower arm. In order to exert an inward force on the arm 42 and retain the valve 44 in engagement with the face of the enlargement 29 and in order to exert an outward pull on the arm 47, the arms are provided with grooves 56, arranged out of alinement with each other, whereby the spring 53 is normally disposed at an angle to the vertical, as shown in Figure 2 of the drawings. The inner face of the casting 10 is provided with stops 57 similar to the stops 52 but arranged in the path of the extension 45 on the arm 42 to limit the movement of the arm 42 and cause the valve 44 to assume positions establishing communication between the central passage 37 and the side passages 38 alternately.

In operation, the device is installed or assembled by forming an opening in the windshield frame for the reception of the hollow bolt 25. The inner side of the windshield frame is also provided with openings (not shown) for the reception of the lugs 26. The bolt 25 is slid over the shaft 6 through the opening in the windshield frame and tightened in the bore of the boss 23. It thus forms a securing means for the motor casing and a bearing for the shaft. The tube 31 is connected to a source of suction, such as the vacuum tank of a vacuum feed gasoline system or directly to the intake manifold of the engine, establishing communication between the passages 30, 32 and 37, and the desired source of suction. In Figure 3 of the drawings, the pistons are shown at the limit of their movement toward the right end of the cylinder and the right lug 51 has just engaged and moved the end 49 of the arm 47 to shift the valves. The valve 44 is thereby moved from the position shown in Figure 4 of the drawings, to the left, establishing communication between the suction passage 37 and the passage 38 to the left. This creates a differential pressure in the cylinder, exhausting the air from the left end while the right end is in communication with the atmosphere through the passages 38 and 39 and tube 40. As the pistons move, the segmental plate oscillates about the shaft 6 as a center, due to the engagement of the teeth 28 with the arc formed by the openings 22 in the bar 19. As the piston reaches its limit of movement, the lug 51 engages the end of the arm 47 and swings this arm on its pivot. The movement of the arm is limited by the stop 52. As the end of the arm swings around the main portion of the arm as a center in an arc of a circle, the spring 53 is placed under tension, and as soon as the spring passes the point where its center line is on the opposite side of the center of arm 42, the pull is exerted on the end of arm 43 and in an opposite direction to swing this arm and shift the valve to the position shown in Figure 4 of the drawings. The movement of the arm 42 is limited by the stops 57 and causes the valve to assume its proper position to establish communication between the passage 37 and either of the passages 38. As stated, the spring 53 is arranged in an angular position to exert an inward pull on the arm 42 and retain the valve 44 in snug engagement with the face of the enlargement 29. The upper end of the spring exerts an outward pull on the arm 47 and prevents displacement of this arm.

It is to be understood that the form of our invention herewith shown and described is to be taken as a preferred example of the same and that various changes in the shape, size, and arrangement of parts may be resorted to without departing from the spirit of the invention or the scope of the subjoined claims.

We claim:

1. In a fluid pressure motor for windshield cleaners, a central member having recesses at its opposite ends and fluid passages opening through said opposite ends, a cylinder comprising a pair of cylindrical members, a piston operable in said cylinder, said cylindrical members having their inner ends open and received in the recesses of said central member through relative sliding axial movement, a tube communicatingly supported in the outer end of each cylindrical member and having its inner end slidably received in the adjacent end fluid passage of said central member by and during positioning movement of the respective cylindrical member into its end recess, whereby the outer ends of said cylindrical members have communication established through the respective tubes with the fluid passages of said central member, valve means for alternately connecting the fluid passages of said central member to a source of operating pressure, and means for clamping the cylindrical members in their respective recesses of said central member and thereby securing the inner ends of said tubes in said central member fluid passages.

2. In a fluid pressure motor for windshield cleaners, a central member having fluid passages opening though its opposite ends, cup-shaped cylinder members arranged with their open ends spaced apart and opposing each other and engaged with said central member, a tube for each cylinder member connected at its outer end to the outer end of the respective cylinder member and having its inner end slipped into the adjacent fluid passage of said central member, means for clamping said cylinder members to said central member and thereby holding the inner ends of said tubes engaged in the fluid passages of said central member, and piston elements operable in said cylinder members.

3. In a fluid pressure motor for windshield cleaners, a metal casting having a cylinder seat in each end and a fluid passage opening through each end, cup-shaped sheet metal cylinders having their open ends engaged in the respective seats of said casting, a piston element in each cylinder, a tube carried by each cylinder and secured at its outer end communicatingly to the outer end of its cylinder, each tube being supported by its cylinder only at its outer end, the inner ends of said tubes being slidably received by the respective fluid passages of said casting by and during axial movement of the cylinders to their seats in said casting, said tubes being supported at their inner ends by said casting, and means frictionally securing the cylinders in position.

4. In a windshield cleaner motor, a central member having fluid passages opening through opposite ends, a pair of cylindrical members having their outer ends closed and their inner ends open and secured to said central member against axial separation, a tube communicatingly supported in the outer end of each cylindrical member and having its inner end slidably received in the adjacent end of the fluid passages of said central member, a piston operable in the cylinder thus formed by said cylindrical members, a valve controlling the supply of operating fluid pressure through said fluid passages, and a single member adapted for being passed through an opening in a windshield frame, and cooperating with the central member for securing the motor to the frame of a windshield.

5. In a windshield cleaner motor, a central member having fluid passages opening through opposite ends, a pair of cylindrical members having their outer ends closed and their inner ends open and secured to said central member against axial separation, a tube communicatingly supported in the outer end of each cylindrical member and having its inner end slidably received in the adjacent end of the fluid passages of said central member, a piston operable in the cylinder thus formed by said cylindrical members, a valve controlling the supply of operating fluid pressure through said fluid passages, said central member having an inwardly extending boss, a wiper-actuating shaft operable by the piston and extending through the boss, and a journal support for the shaft consisting of a tubular bolt threadingly engaged in said boss and adapted to extend through an opening in the frame of a windshield for clamping the motor to the windshield frame.

6. In a windshield cleaner motor, a pair of cup-shaped, sheet metal cylindrical members arranged with their open ends in opposition, a clamp member passing about the open ends of the cylindrical members and securing the same in axial alinement, said clamping member having an inwardly extending hollow boss, a piston operable in the cylinder formed by said cylindrical members, means under the control of the piston for operatively admitting fluid pressure into the cylinder on opposite sides of the piston, a rock shaft extending through the boss and operable by and during movement of the piston, a journal bearing supporting the rock shaft within the boss and extending outwardly beyond the clamp member for passing through an opening in the frame of a windshield for supporting the shaft where it passes the opening in the windshield frame, the outer end of said journal bearing being provided with a shoulder for impinging against the adjacent side of the windshield frame, said journal bearing having threaded engagement with the bore of said boss.

7. In a fluid pressure motor for windshield cleaners, a pair of cup-shaped sheet metal members arranged with their open ends in opposition and in axial alinement, a central casting embracing the opposing ends of said members and clampingly securing same against displacement, a piston operable in each member, means connecting said pistons for unity in movement, a wiper shaft operating through said casting and operable by and during movement of said pistons, means for operatively admitting fluid pressure into the outer closed ends of said members, and means constituting a bearing for the shaft and connected to the central casting for supporting the windshield cleaner motor from a windshield frame.

8. In a fluid pressure motor for windshield cleaners, a pair of cup-shaped sheet metal members arranged with their open ends in opposition and in axial alinement, a central casting embracing the opposed ends of said members and clampingly securing same against displacement, a piston operable in each member, means connecting said pistons for unity in movement, a wiper shaft operating through said casting and operable by and during movement of said pistons, said casting having fluid passages opening exteriorly of said members and toward the outer ends thereof, a tube carried by each member in communication with the outer closed end thereof, said tubes having their inner ends slidably received in the fluid passages of said casting, valve mechanism supported on said central casting and operable by and during movement of the pistons for operatively admitting fluid pressure through said tubes into the outer closed ends of said members, and means for attaching the windshield cleaner motor to the frame of a windshield, said means cooperating with and engaging the central casting and rotatably supporting the wiper shaft.

FREDERICK G. FOLBERTH.
WILLIAM M. FOLBERTH.